(12) United States Patent
Kunishima et al.

(10) Patent No.: US 9,523,059 B2
(45) Date of Patent: Dec. 20, 2016

(54) SLIDING MEMBER

(71) Applicant: JTEKT CORPORATION, Osaka-shi, Osaka (JP)

(72) Inventors: Takeshi Kunishima, Shiki-gun (JP); Takashi Amoh, Itano-gun (JP); Keisuke Miyamoto, Ichinomiya (JP); Masako Jimbo, Kakamigahara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/835,197

(22) Filed: Aug. 25, 2015

(65) Prior Publication Data

US 2016/0068779 A1   Mar. 10, 2016

(30) Foreign Application Priority Data

Sep. 9, 2014 (JP) ................. 2014-183429

(51) Int. Cl.
*C10M 107/38* (2006.01)
*F16J 15/32* (2016.01)
*C08J 7/04* (2006.01)

(52) U.S. Cl.
CPC ............ *C10M 107/38* (2013.01); *C08J 7/047* (2013.01); *F16J 15/324* (2013.01); *F16J 15/3284* (2013.01); *C08J 2327/12* (2013.01); *C08J 2427/12* (2013.01); *C08J 2463/00* (2013.01); *C10N 2220/082* (2013.01); *C10N 2230/06* (2013.01); *C10N 2250/12* (2013.01)

(58) Field of Classification Search
CPC ...... C10M 107/38; F16J 1/324; F16J 15/3284; C08J 7/047; C08J 2327/12; C08J 2427/12; C08J 2463/00; C10N 2220/082; C10N 2230/06
See application file for complete search history.

(56) References Cited

U.S. PATENT DOCUMENTS 5,075,378 A * 12/1991 Smierciak ............... C08G 59/40
                                                     525/109
9,222,166 B2 * 12/2015 Sugimoto ............. C23C 14/025

FOREIGN PATENT DOCUMENTS

JP         2003-165856 A    6/2003

* cited by examiner

*Primary Examiner* — Cephia D Toomer
(74) *Attorney, Agent, or Firm* — Oliff PLC

(57) ABSTRACT

In a sliding member, a sliding surface of a substrate of fluorine rubber on which another member slides is covered with a coating that is formed of an epoxy resin having a scratch hardness (Pencil Method) after curing of F to 2H and in which fluorine resin powder is dispersed.

2 Claims, 3 Drawing Sheets

SLIDING MEMBER

INCORPORATION BY REFERENCE

The disclosure of Japanese Patent Application No. 2014-183429 filed on Sep. 9, 2014 including the specification, drawings and abstract, is incorporated herein by reference in its entirety.

BACKGROUND OF THE INVENTION

1. Field of the Invention

The invention relates to a sliding member used for an oil seal and the like.

2. Description of Related Art

An oil seal is assembled on a rotating shaft for an engine of an automobile in order to prevent, for example, leakage of oil through an end of the rotating shaft, and conversely, entry of external dust. The oil seal needs to be highly resistant to heat and oil. Thus, fluorine rubber is often used as a formation material for a sliding member used for the oil seal. For the oil seal, there has also been a request for a substantial reduction in sliding torque in order to meet recent demands for energy saving and an extended life of the oil seal.

Thus, effort has been made to cover a sliding surface of a seal lip on which the rotating shaft slides with a coating that enables friction to be reduced and that is highly resistant to wear. Japanese Patent Application Publication No. 2003-165856 (JP 2003-165856 A) discloses that a sealing material (O ring) for a manufacturing apparatus for semiconductor devices and the like is formed of fluorine rubber and that a surface of the sealing material is covered with a coating that is formed of a silicone resin, a fluorine resin, or a polyimide resin and in which fluorine resin powder is dispersed.

This coating contains the fluorine resin powder that functions as a solid lubricant and thus enables friction to be reduced, and is also highly resistant to wear. Thus, such a coating is expected to be used to cover a sliding member such as an oil seal.

However, when the conventional coating is used for the sliding member such as an oil seal, the coating may fail to withstand sliding of the rotating shaft or the like, which rotates at high speed, and crack in a short period of time or may be likely to be peel off in a short period of time due to insufficient adhesion to the oil seal, which serves as a base. When the coating cracks, sealing performance may be significantly degraded in a short period of time based on a change in contact form resulting from the destruction of the base material. Furthermore, when peel-off of the coating starts at the position of the crack, the capability of reducing friction is lost, and the sliding torque may increase significantly in a short period of time.

SUMMARY OF THE INVENTION

An object of the present invention is to provide a sliding member that has a coating that enables friction to be reduced and exhibits high wear resistance during sliding and that withstands, in the case of, for example, an oil seal, sliding of a rotating shaft rotating at high speed to avoid cracking or peeling off in a short period of time, allowing the sliding torque-reduction effect of the coating to be maintained for a long period of time since the beginning of use, while keeping appropriate sealing performance.

A sliding member according to an aspect of the present invention is formed of fluorine rubber and includes a substrate with a sliding surface on which another member slides and a coating that covers at least the sliding surface. The coating contains an epoxy resin in which fluorine resin powder is dispersed and has a scratch hardness (Pencil Method) of F to 2H.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
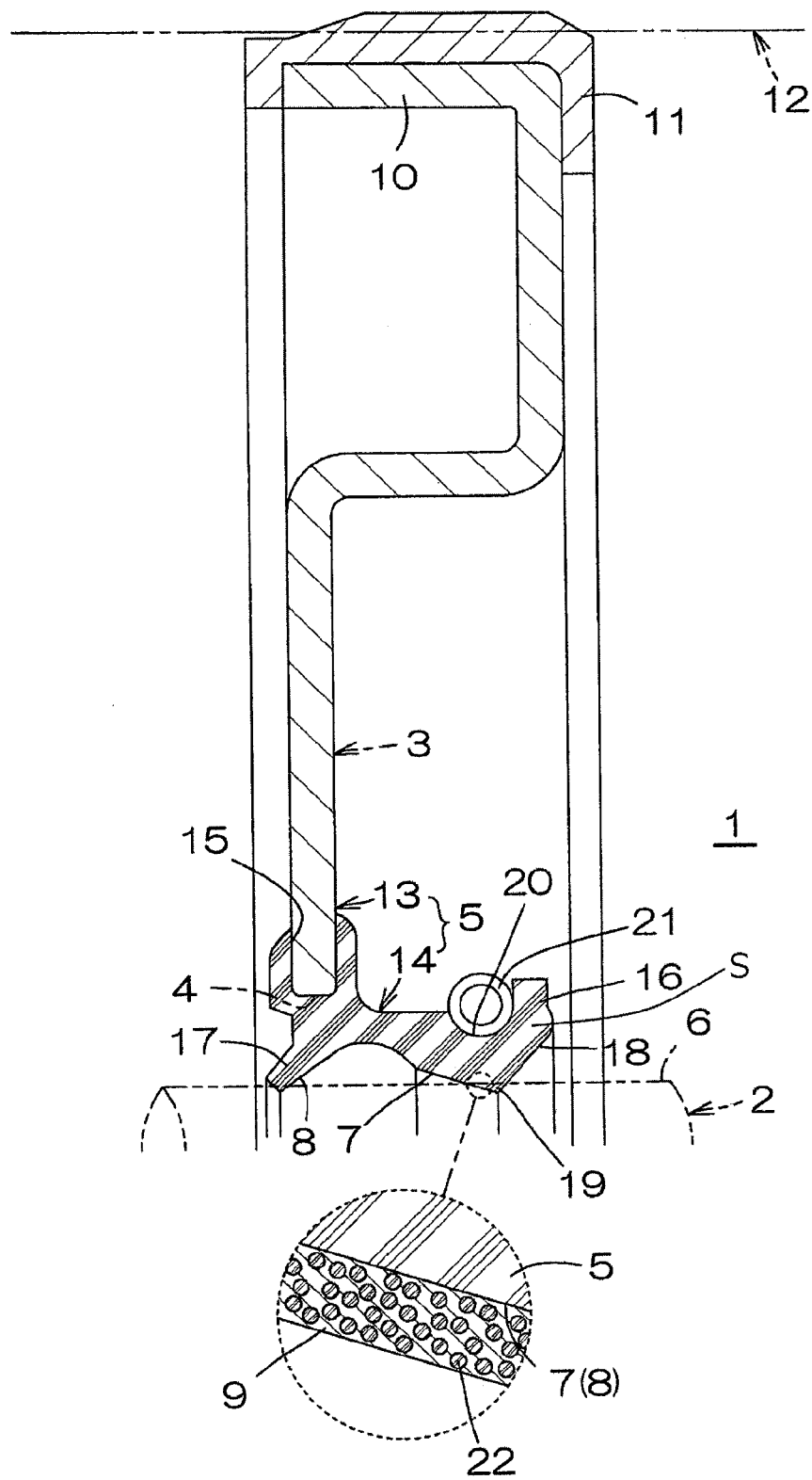
FIG. 1 is a sectional view of an oil seal as an example of an embodiment of a sliding member of the present invention.

FIG. 1 is a sectional view of an oil seal as an example of an embodiment of a sliding member of the present invention. As seen in FIG. 1, the oil seal in this example is intended to seal a gap between a rotating shaft 2 as another member and a metallic ring 3 that is a ring surrounding the rotating shaft 2. A sliding member S included in the oil seal 1 includes a substrate 5 and a coating 9. The substrate 5 is secured to a radially inner end 4 of the metallic ring 3 and is integrally formed of fluorine rubber as a whole. The coating 9 covers tapered surfaces 7 and 8 of the substrate 5 that serve as sliding surfaces for an outer peripheral surface 6 of the rotating shaft 2.

The metallic ring 3 is fixedly fitted into a housing 12 surrounding the metallic ring 3 with a fitting portion 11 compressively deformed between the metallic ring 3 and the housing 12. The fitting portion 11 is secured to a radially outer end 10 of the metallic ring 3 and integrally formed of fluorine rubber. The substrate 5 includes an annular fixing portion 13 and an annular seal lip 14. The fixing portion 13 is fixed to the radially inner end 4 of the metallic ring 3. The seal lip 14 extends radially inward from an inner periphery of the fixing portion 13 and contacts the outer peripheral surface 6 of the rotating shaft 2.

The fixing portion 13 is shaped like a disc and has an annular groove 15 that extends radially inward from an outer periphery of the fixing portion 13 to receive the radially inner end 4 of the metallic ring 3. The width of the groove 15 in an axial direction of the rotating shaft 2 is set approximately equal to or slightly smaller than the thickness of the metallic ring 3. The outside diameter of an outer periphery of a bottom of the groove 15 is set approximately equal to or slightly smaller than the inside diameter of the radially inner end 4 of the metallic ring 3. These settings allow the fixing portion 13 to be fixedly fitted into the metallic ring 3.

The seal lip 14 includes a main lip portion 16 and a sub-lip portion 17 with a generally plate-like sectional shape. The main lip portion 16 extends radially inward from an inner periphery of the fixing portion 13 and rightward in FIG. 1. The sub-lip portion 17 extends radially inward from the inner periphery of the fixing portion 13 and leftward in FIG. 1. A tapered surface 7 and a tapered surface 18 are provided on an inner periphery of a leading end of the main lip portion 16. The tapered surface 7 has an inside diameter gradually decreasing from a fixing portion 13 side of the main lip portion 16 toward a leading end of the main lip portion 16. In contrast, the tapered surface 18 has an inside diameter gradually decreasing from the leading end of the main lip portion 16 toward the fixing portion 13 side of the main lip portion 16. A ridge portion between the tapered surfaces 7 and 18 forms a lip 19 that contacts the outer peripheral surface 6 of the rotating shaft 2.

A ring-like groove 20 is formed on the opposite side (radially outer surface) of the main lip portion 16 from the lip 19 so as to extend along the entire periphery of the main lip portion 16. In the groove 20, a gutter spring 21 is fitted which regulates radially outward deformation of the main lip portion 16. Moreover, an inner periphery of the sub-lip portion 17 is the tapered surface 8 with an inside diameter gradually increasing from a fixing portion 13 side of the sub-lip portion 17 toward a leading end of the sub-lip portion 17.

As described above, the tapered surface 7 of the main lip portion 16 and the tapered surface 8 of the sub-lip portion 17 function as sliding surfaces for the outer peripheral surface 6 of the rotating shaft 2 and are covered with a coating 9 in the present invention. The coating 9 contains an epoxy resin in which fluorine resin powder 22 is dispersed, and has a scratch hardness of F to 2H. The measurement of scratch hardness was carried out based on JIS K5600-5-4 "Testing Methods for Paints, Part 5: Mechanical Property of Film, Section 4: Scratch Hardness (Pencil Method)".

The coating 9 is formed by coating the tapered surfaces 7 and 8, by a spray process etc., with a liquid coating material containing an uncured epoxy resin in which the fluorine resin powder 22 is dispersed such that the coating material has a scratch hardness within the above-described range after curing, and then causing curing reaction of the epoxy resin. When the substrate 5 is produced, the substrate 5 is typically molded to have such a shape that the lip 19 is joined to the substrate 5 along the entire periphery thereof with a thin film of fluorine rubber, and the film is cut (lip cut) to form the lip 19. However, the coating 9 is preferably formed by applying the coating material to the tapered surface 7 before the lip cut.

If the coating 9 is formed after the lip cut, the thickness of the coating 9 may be uneven near the lip 19 based on irregular recesses and protrusions on the cut portion, leading to degraded sealing performance. In contrast, when the lip cut is performed after formation of a coating 9 with an even thickness on a smooth surface not subjected to the lip cut, the coating 9 with the even thickness can be formed to extend to the vicinity of the cut portion, preventing degraded sealing performance.

To cause curing reaction of the epoxy resin, for example, the coating 9 may be heated. A heating temperature is preferably 100° C. or higher and 230° C. or lower. A heating temperature lower than the temperature within above-described range may preclude the epoxy resin from being sufficiently cured. A heating temperature higher than the temperature within above-described range may affect the characteristics of the substrate 5 formed of fluorine rubber and serving as a base.

The epoxy resin forming the coating 9 may be one or more of, for example, a bisphenol A epoxy resin, a bisphenol F epoxy resin, phenol novolac epoxy resin, a cresol novolac epoxy resin, an alicyclic epoxy resin, a hydrogenated bisphenol A epoxy resin, a hydrogenated bisphenol AD epoxy resin, an aliphatic epoxy resin, an epoxy resin containing an aliphatic or aromatic amine and epichlorohydrin, an epoxy resin containing an aliphatic or aromatic carboxylic acid and epichlorohydrin, a heterocyclic epoxy resin, a spiro-ring-containing epoxy resin, epoxy modified resin, and a brominated epoxy resin.

A liquid epoxy resin is preferably used particularly because a liquid coating material is used. However, even if a solid epoxy resin is used, a liquid coating material can be prepared by compounding the resin with a reactive diluent or a solvent. A curing agent that causes the epoxy resin to be cured may be a combination of one or more of, for example, amine curing agents such as an aliphatic amine, an alicyclic amine, a cyclic amine, an aromatic amine, polyaminoamide, polyamide with an epoxy compound addition, a Micheal addition polyamine, a Mannich addition polyamine, and a tertiary amine compound, and known curing agents such as an imidazole compound and an isocyanate compound which enable the epoxy resin to be cured.

The scratch hardness of the coating 9 resulting from curing of the epoxy resin is limited to the range from F to 2H for the following reason. That is, a soft coating 9 with a scratch hardness of less than F fails to enable friction to be sufficiently reduced and is ineffective for reducing a sliding torque exerted on the rotating shaft 2 via the oil seal 1 in spite of the fluorine resin powder dispersed in the coating 9.

Such a soft coating 9 is insufficiently resistant to wear in spite of the fluorine resin powder dispersed in the coating 9 and is likely to be worn off in a relatively short period of time. This results in degraded sealing performance and an increased sliding torque. On the other hand, a hard coating 9 with a scratch hardness of more than 2H has insufficient flexibility. Thus, the coating 9 fails to sufficiently follow deformation of fluorine rubber or the like and is thus likely to crack or peel off in a short period of time when subjected to sliding of the rotating shaft 2. The sealing performance of the coating 9 is also degraded.

In contrast, when the scratch hardness of the coating 9 resulting from the curing of the epoxy resin is set within the above-described range, the coating 9 is provided with the appropriate capability of enabling friction to be reduced. Thus, a combination of this capability with fluorine resin powder dispersed in the coating 9 allows enhancement of the effect reducing the sliding torque exerted on the rotating shaft 2 via the oil seal 1. The flexibility of the coating 9 can also be improved to allow the coating 9 to sufficiently follow the deformation of the fluorine rubber or the like. The coating 9 can be prevented from cracking or peeling off in a short period of time when subjected to sliding of the rotating shaft 2, and can also keep the appropriate sealing performance.

To adjust the scratch hardness of the coating 9 resulting from the curing of the epoxy resin to within the above-described range, it is preferable to change, as needed, the type or grade of the epoxy resin, the compounding ratio of epoxy resins in the case where two or more types of resins are used, the type or grade of the curing agent, the compounding ratio of the curing agent to the epoxy resin, the compounding ratio of a plurality of curing agents, or the like. The same effect as that of the present embodiment cannot be obtained when the coating is formed of, instead of the epoxy resin, another resin such as a phenol resin or a silicone resin.

For example, for the phenol resin, even when having a scratch hardness of F to 2H after the curing, the coating exhibits much lower flexibility than the coating 9 formed of the epoxy resin. Also, the phenol resin does not have sufficient adhesiveness to the fluorine rubber equivalent to that of the epoxy resin. On the other hand, for the silicone resin, the scratch hardness of the coating 9 resulting from the curing can be set within the range from F to 2H. However, the silicone resin does not have sufficient adhesiveness to the fluorine rubber equivalent to that of the epoxy resin.

Thus, both the coatings formed of phenol resin and silicone resin fail to follow deformation of the fluorine rubber forming the substrate and are likely to crack or peel off in a short period of time when subjected to sliding of the rotating shaft or the like. Furthermore, these coatings fail to adhere appropriately to the rotating shaft or the like and thus fail to exhibit sufficient sealing performance. As the fluorine resin powder dispersed in the coating 9, various types of fluorine resin powder that can function as solid lubricants can be used.

Such fluorine resin powder may be one or more types of powder of a fluorine resin, for example, polytetrafluoroethylene (PTFE), a tetrafluoroethylene-hexafluoropropylene copolymer (FEP), a tetrafluoroethylene-perfluoroalkylvinylether copolymer (PFA), an ethylene-tetrafluoroethylene copolymer (ETFE), an ethylene-chlorotrifluoroethylene copolymer (ECTFE), polyvinylidene fluoride (PVDF), or polyvinyl fluoride (PVF). In particular, polytetrafluoroethylene (PTFE) is preferable.

The fluorine resin powder preferably has an average particle size of 0.1 µm or more, particularly 1 µm or more, and more particularly 3 µm or more, and 10 µm or less or particularly 5 µm or less. When the average particle size is smaller than the above-described range, the effect of the coating 9 enhancing the wear resistance based on the dispersion of the fluorine resin powder is insufficient, though this depends on the filling rate at which the coating is filled with the powder. Thus, the coating 9 is worn off in a relatively short period of time, increasing the sliding torque and degrading the sealing performance.

When the average particle size is larger than the above-described range, the smoothness of the surface of the coating 9 decreases, which may degrade the sealing performance. Furthermore, fluorine resin powder with a large particle size is likely to fall off from the coating 9 as a result of the friction, and crack or peel-off is likely to occur at the area from which the fluorine resin powder has fallen off. Thus, an increase in sliding torque and degradation of the sealing performance may occur in a relatively short period of time. In contrast, setting the average particle size of the fluorine resin powder to within the above-described range more drastically reduces the sliding torque exerted on the rotating shaft or the like via the oil seal 1, which serves as a sliding member. This can prevent possible degradation of the sealing performance and a possible increase in sliding torque over a longer period of time.

The filling rate of the fluorine resin powder is preferably 5 vol % or more and 15 vol % or less of the cured coating 9. When the filling rate of the fluorine resin powder is less than 5 vol % of the cured coating 9, the effect of the coating 9 enabling friction to be reduced and enhancing the wear resistance based on the dispersion of the fluorine resin powder is insufficient. Thus, the coating 9 may be worn off in a relatively short period of time, degrading the sealing performance and increasing the sliding torque. Furthermore, the initial sliding torque may increase.

On the other hand, when the filling rate of the fluorine resin powder is more than 15 vol % of the cured coating 9, the smoothness of the surface of the coating 9 decreases to degrade the effect of the coating 9 itself reducing friction. Thus, the effect enabling friction to be reduced may fail to be sufficiently achieved. Furthermore, the smoothness of the surface may decrease to hinder the appropriate sealing performance from being achieved. Moreover, a relative decrease in the rate of the epoxy resin forming the coating 9 reduces the strength of the coating 9. The coating 9 may crack or peel off in a relatively short period of time, degrading the sealing performance and increasing the sliding torque.

In contrast, setting the filling rate of the fluorine resin powder to 5 vol % or more and 15 vol % or less of the cured coating 9 more drastically reduces the sliding torque exerted on the rotating shaft 2 or the like via the oil seal 1, which serves as the sliding member. Then, possible degradation of the sealing performance and a possible increase in sliding torque can be prevented over a longer period of time. In view of the further enhanced sealing performance, the preferable filling rate of the fluorine resin powder is, within the above-described range, 10 vol % or less of the cured coating 9.

As the fluorine rubber forming the substrate 5, various types of fluorine rubber that are cross-linkable may be used. Examples of such fluorine rubber include, though not limited to, bipolymers or terpolymers resulting from copolymerization of at least one selected from a first group consisting of tetrafluoroethylene (TFE), vinylidene fluoride (VDF), and ethylene (E) that form a main chain for the rubber and at least one selected from a second group consisting of hexafluoropropylene (HFP), perfluoroalkylvinylether (PFVE; a specific example is perfluoromethylvinylether), and propylene (P) that allow a crosslinking point to be introduced into the main chain; however, a bipolymer of ethylene (E) and propylene (P), neither of which contains fluorine, is excluded.

More specific examples of the fluorine resin powder include one or more polymers such as a bipolymer of VDF and HFP, a bipolymer of TFE and PFVE, a bipolymer of TFE and P, a terpolymer of VDF, TFE, and HFP, a terpolymer of VDF, TFE, and PFVE, a terpolymer of VDF, TFE, and P, and a terpolymer of E, TFE, and PFVE. Furthermore, the fluorine rubber may be a bipolymer or a multi-component copolymer of each of the above-described components and any other fluorine-containing monomer, a mixture of two or more of these copolymers, or the like.

The bipolymer or the terpolymer may be formed by actually copolymerizing the monomers in the first and second groups mentioned above. Moreover, a structure substantially corresponding to the bipolymer or the terpolymer may be formed by introducing side chains and the like into a preformed main chain during a posttreatment. The fluorine rubber may be compounded, as needed, with various types of additives at appropriate ratios. Examples of the additives include a crosslinking agent that allows the fluorine rubber to be cross-linked, a reinforcing agent that reinforces the fluorine rubber, or a processing aid such as a softener, a plasticizer, or a tackifier.

The sliding member S in the present invention is not limited to the above-described oil seal. The configuration in the present invention can be applied to various sliding members that are formed of fluorine rubber and that include a substrate with a sliding surface on which another member slides.

The results of verification of flexibility will be described below. The following were prepared as coating materials of which the coating was formed: a coating material of an epoxy resin having a scratch hardness after curing of F, 2H, or 4H, a coating material of a phenol resin having a scratch hardness after curing of 2H, and a coating material of a silicone resin having a scratch hardness after curing of 7H. Each of the coating materials was compounded with fluorine resin powder with an average particle size of 1 μm such that the filling rate was 10 vol % of the cured substrate.

Each of the coating materials was applied to a surface of a sheet (substrate) of fluorine rubber by a spray process. The sheet was then heated to 180° C. to cause curing reaction to produce a sample. The sample was then sequentially wound around mandrels with varying mandrel diameters starting with 90 mm and decreasing by 5 mm. A mandrel diameter was recorded at which the coating cracked. A coating with a smaller mandrel diameter at which the coating cracked is evaluated to be appropriately flexible. The test was carried out based on JIS K5600-5-1 "Testing Methods for Paints, Part 5: Mechanical Property of Film, Section 1: Bend Test (Cylindrical Mandrel)"

Figure 2:
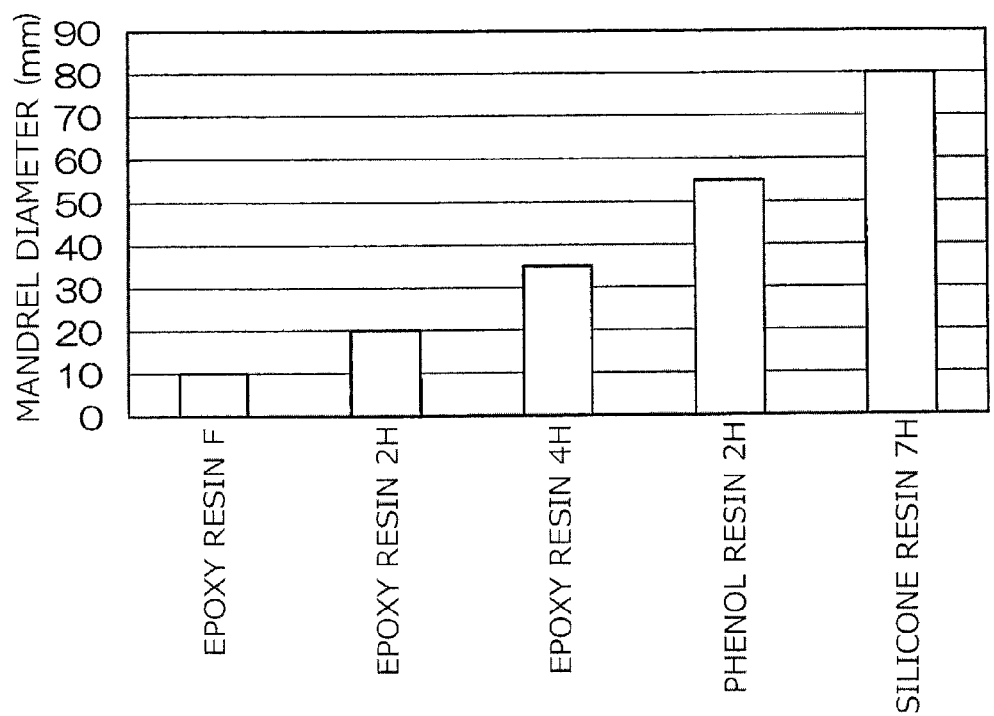
FIG. 2 is a graph illustrating a relationship between a scratch hardness of a coating resulting from curing of a resin such as an epoxy resin and a mandrel diameter at which a crack occurred, which is a reference for flexibility.

The results are shown in FIG. 2. FIG. 2 indicates that, when the resin component was silicone, the coating formed was not flexible enough to set the scratch hardness resulting from curing within the range from F to 2H and cracked at a mandrel diameter of 80 mm. FIG. 2 also indicates that, when the resin component was phenol, a coating with a scratch hardness of 2H, within the range from F to 2H, was successfully formed, but the flexibility of the coating and the adhesion thereof to the fluorine rubber were insufficient, and the coating cracked at a mandrel diameter of 55 mm.

In contrast, a coating with an epoxy resin component has been found to be excellent in flexibility and adhesion to the fluorine rubber and less likely to crack than the coating formed of the silicone resin or the phenol resin. It has been found that the scratch hardness of the cured coating needs to be set to 2H or less in order to enhance the above-described effects.

The results of verification of the sealing performance will be described below. The following were prepared as coating materials of which the coating was formed: a coating material of an epoxy resin having a scratch hardness after curing of F and a coating material of a phenol resin having a scratch hardness after curing of 2H. Each of the coating materials was compounded with fluorine resin powder with an average particle size of 3 to 5 μm such that the filling rate was 10 vol % of the cured substrate.

A lip portion of an actual oil seal was coated with each of the coating materials and cut. Then, the seal inner periphery was fitted over a shaft of an air leak tester under conditions including an axis eccentricity of 0.1 mm and an assembly eccentricity of 0.1 mm, and a pressure of 10 kPa was applied to one side of the oil seal (an oil side of the oil seal). Changes in pressure over time were measured. The results are shown in FIG. 3.

Figure 3:
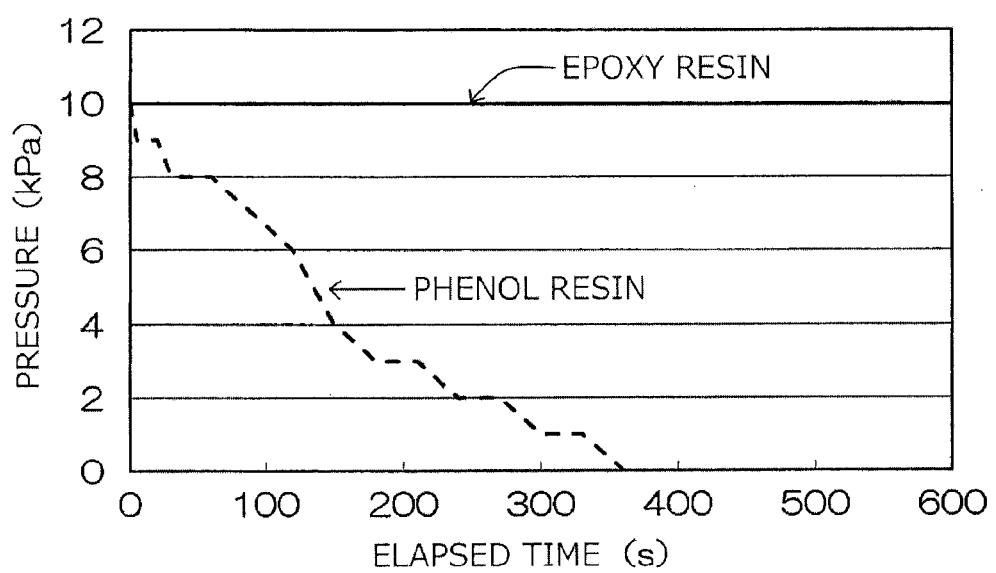
FIG. 3 is a graph illustrating a relationship between: transition of pressure, which is a reference for sealing performance; and the type of the resin and the scratch hardness of the coating after curing.

FIG. 3 indicates that the coating formed of the phenol resin component (dashed line) exhibited insufficient sealing performance in spite of a scratch hardness after curing of 2H and that the pressure decreased in a short time due to leakage. In contrast, FIG. 3 indicates that the coating formed of the epoxy resin component (continuous line) and having a scratch hardness after curing of F exhibited excellent sealing performance and caused no leakage, avoiding a decrease in pressure.

The results of verification of the sliding torque will be described below. Coating materials of epoxy resins were prepared, which had a scratch hardness after curing of 2B, B, F, 2H, 4H, or 5H. Each of the coating materials was compounded with fluorine resin powder with an average particle size of 3 to 5 μm such that the filling rate was 10 vol % of the cured substrate.

Figure 4:
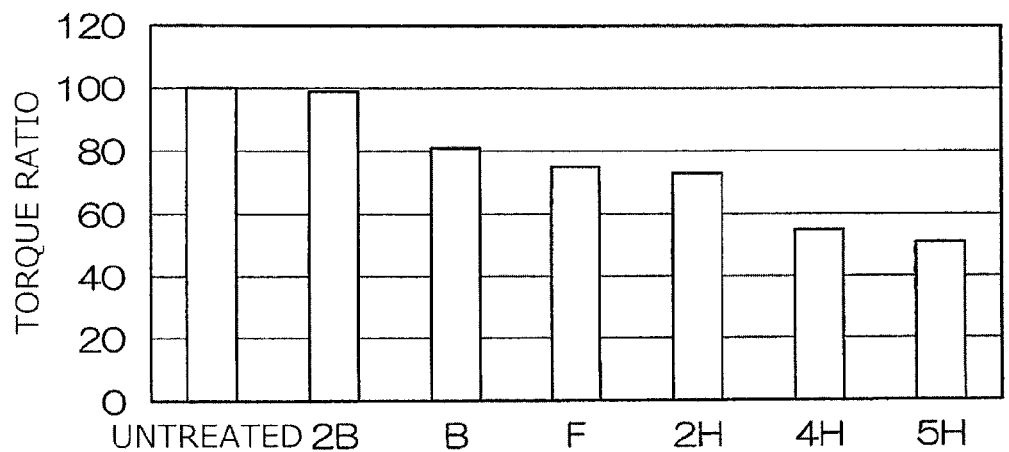
FIG. 4 is a graph illustrating a relationship between the scratch hardness of the coating resulting from the curing of the epoxy resin and a sliding torque.

A lip portion of an actual oil seal was coated with each of the coating materials and cut. Then, the seal inner periphery was fitted over the shaft of the air leak tester, and the seal was rotated at 2,000 $\text{min}^{-1}$ for 30 minutes in an engine oil bath with the temperature of the oil adjusted to 80° C. Then, the sliding torque (stable value) was measured. The results are shown in FIG. 4. FIG. 4 illustrates comparisons with the measurement result of an untreated oil seal with no coating formed thereon defined to be 100.

FIG. 4 indicates that the coating having a scratch hardness of F or more as a result of curing of the epoxy resin is excellent in sliding torque-reduction effect.

The results of verification of the filling rate of the fluorine resin powder will be described below. The following were prepared as coating materials of which the coating was formed: coating materials of an epoxy resin that had a scratch hardness after curing of F and for which the filling rate of fluorine resin powder with an average particle size of 1 μm was 5 vol %, 10 vol %, or 15 vol % of the cured coating.

Figure 5:
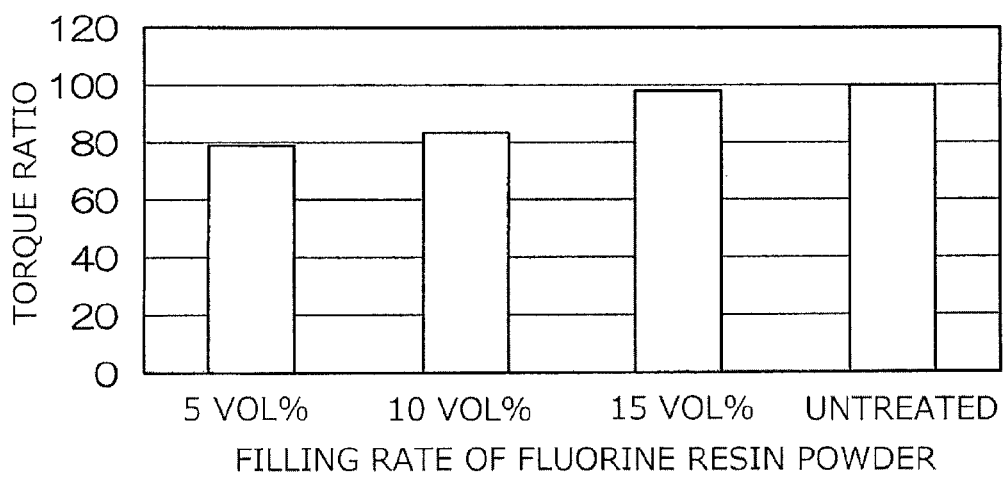
FIG. 5 is a graph illustrating a relationship between a filling rate of fluorine resin powder dispersed in a coating and the sliding torque.

A lip portion of an actual oil seal was coated with each of the coating materials and cut. Then, the seal inner periphery was fitted over the shaft of the air leak tester, and the seal was rotated at 2,000 $\text{min}^{-1}$ for 30 minutes in an engine oil bath with the temperature of the oil adjusted to 80° C. Then, the sliding torque (stable value) was measured. The results are shown in FIG. 5. FIG. 5 illustrates comparisons with the measurement result of an untreated oil seal with no coating formed thereon defined to be 100.

FIG. 5 indicates that the filling rate of the fluorine resin powder is preferably 5 vol % or more and 15 vol % or less of the cured coating and particularly preferably 10 vol % or less of the cured coating in view of reduction in sliding torque.

What is claimed is:

1. A sliding member formed of fluorine rubber, the sliding member comprising:
    a substrate with a sliding surface on which another member slides; and
    a coating that covers at least the sliding surface, wherein the coating contains an epoxy resin in which fluorine resin powder is dispersed and has a scratch hardness (Pencil Method) of F to 2H.

2. The sliding member according to claim 1, wherein a filling rate at which the coating is filled with the fluorine resin powder is 5 vol % or more and 15 vol % or less of the cured coating.

* * * * *